V. A. FYNN.
DYNAMO ELECTRIC MACHINE.
APPLICATION FILED JUNE 15, 1912.
1,108,568.
Patented Aug. 25, 1914.
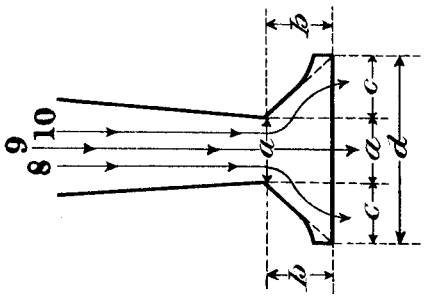
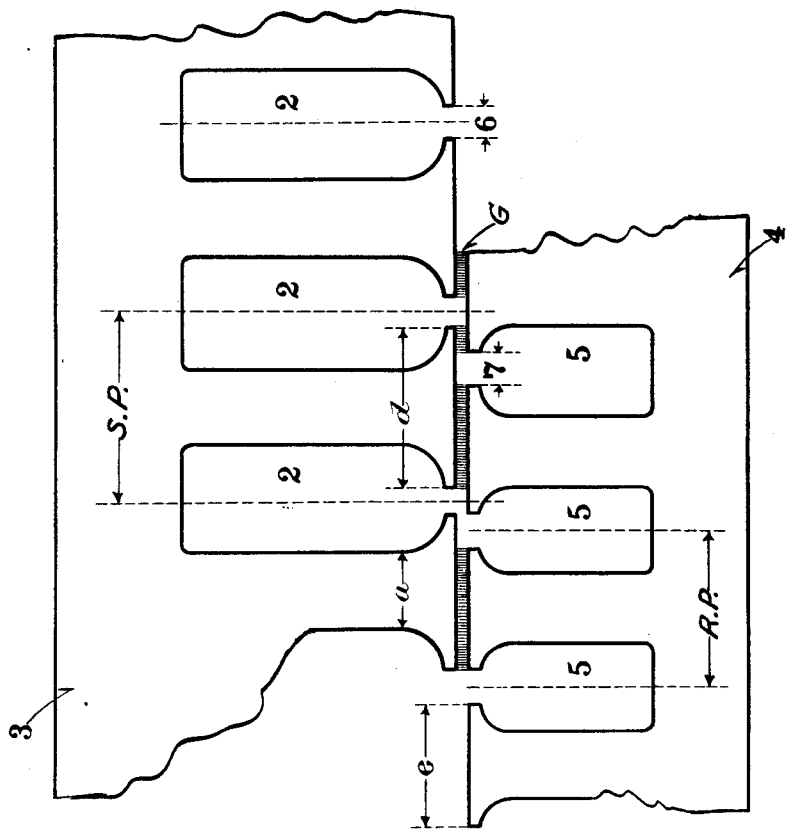
WITNESSES:
INVENTOR

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,108,568.  Specification of Letters Patent.  Patented Aug. 25, 1914.

Application filed June 15, 1912. Serial No. 703,779.

*To all whom it may concern:*

Be it known that I, VALÈRE ALFRED FYNN, a subject of the King of England, residing at St. Louis, Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to all such dynamo electric machines as carry windings embedded in slots or tunnels placed close to the air-gap. It is particularly applicable to single-phase and polyphase alternate current induction motors, to rotary converters without defined polar projection, and to direct current dynamos and motors having slotted armatures and field poles. It is known that such machines, and particularly, those operating with alternating currents, produce most unwelcome "humming" or "singing" noises, which often militate against their use and are always disagreeable. Many unsuccessful attempts have been made to find the cause for the production of these noises and to provide remedies therefor.

I have discovered how the production of the noises mentioned may be avoided in machines of any size and any type, and my invention, therefore, consists in providing means to this end.

I will describe my invention with reference to an alternate current induction motor of the usual type, comprising a stator without defined polar projections and a rotor revolving within said stator, both being provided with a number of slots for the accommodation of the windings. To render such a structure noiseless, it is, of course, necessary to provide a stiff frame for the stator laminations and to suitably compress the stator and rotor laminations. While these conditions must exist and have existed in prior machines, yet they, alone, do not render a machine noiseless. I have found that it is a necessity that the cross section offered to the passage of the various fluxes present in the machine, or of the resultant flux of the machine, be as constant as possible for all possible positions of said flux. While this condition is easily fulfilled for the iron portion of the circuit, it is difficult to fulfil it for the air-gap. I have, however, found that this condition is absolutely fulfilled if the effective width of the tooth crown of one member is made equal to the tooth pitch of the other member. For perfect results, it is necessary that the tooth crowns of both stator and rotor be fully effective. A machine, the air-gap cross-section of which is dimensioned as just described, will run silently, even if the air-gap is reduced to the smallest possible dimensions.

Referring to the drawings, Figure 1 illustrates a developed set of stator and rotor punchings suitable for polyphase or single-phase alternate current motors and dimensioned according to this invention, while Fig. 2 indicates how the stator or rotor teeth should be shaped in order to make their crowns fully effective.

In Fig. 1, the stator punching is shown at 3; the rotor punching at 4. The former is provided with a number of slots 2; the latter with a number of slots 5. The opening of the stator slots is shown at 6, that of the rotor slots at 7, and it is seen that the crown width $d$ of the stator tooth is equal to the crown width $e$ of the rotor tooth plus a rotor slot opening 7: or, in other words, that the crown width $d$ of a stator tooth is equal to the rotor pitch RP. A careful examination of this figure will show that, in the case of a stator and rotor dimensioned in the manner shown, the air-gap cross-section will be absolutely constant for all positions of the rotor stamping 4 with respect to the stator stamping 3. I have found that the actual ratio of the number of stator slots to the number of rotor slots has no influence on the production of noise, provided the number of slots per pole is not reduced to an absurdly low figure; but that the number of rotor slots which will successfully coöperate with a given number of stator slots depends on the magnitude of the stator slot opening 6. The size of the rotor slot opening 7 is also immaterial, but those skilled in the art will understand that it will be best, in all induction motors, to keep the size of the slot openings 6 and 7 as small as leakage conditions will allow.

In order to carry out my invention, it is necessary to make the magnetically effective crown width of the tooth of the preponderant member equal to the tooth pitch of the other member. By "preponderant member," I mean the one which establishes the space location of the poles of the dynamo electric machine. Thus, in a polyphase motor, it is the stator which is, as a rule, the preponderant member, for the reason that it is usually connected to the mains and is responsible for the only flux which is really present in the machine. In the case of the single-phase induction motor, the original component of the revolving field is produced from the stator and the latter can, therefore, be looked upon as the preponderant member. In a rotary converter, it is the rotor which is the preponderant member.

As previously indicated, another condition to be observed in producing a noiseless machine is to so dimension the stator and rotor teeth as to make the crown of each fully effective. Fig. 2 will help to illustrate my meaning. The crown $d$ of the tooth of a preponderant member shown in Fig. 2 is said to be fully effective when the flux threading the waist $a$ of the tooth can so divide beyond that waist as to produce a practically uniform density along the whole crown of said tooth or any portion or portions thereof which are, at any given instant, during the operation of the machine, opposite to a tooth or portions of teeth of the other member. This crown may be divided into three portions: a central one $a$ corresponding in size to the waist, and two side portions, or lips $c$. In order to make the whole crown $d$ effective, the cross sections such as $b$ located in the path of the fluxes 8 and 10 threading the lips of the crown, should be such as not to raise the flux density through any of those sections above that existing in the central portion $a$ of the crown. This condition will in most cases be practically fulfilled if the distance $b$ is made equal to the distance $c$ and no metal is cut away from the tooth inside of the hypotenuse of the right angle triangle formed by $b$ and $c$. Those skilled in the art will recognize that the design of fully effective tooth crowns should always take into consideration the magnitude of the densities in the waist.

Unsuccessful attempts have been made to produce noiseless motors by designing them with a relatively large air-gap and operating them at low densities. It is perfectly well understood that a large air-gap is detrimental in many respects and that a low density is expensive. In building my improved dynamo electric machines, it is not necessary to increase the air-gap beyond that necessitated by mechanical reasons and the densities can be pushed as high as other conditions will allow without running the risk of producing a noisy machine. In this way a very large saving in material is secured as well as a better performance. I have found that induction motors having rotor diameters not exceeding ten (10) inches can be safely designed with an air-gap approximately determined by the formula:

$$\frac{\text{Diameter in mils}}{600,000}+.005''$$

and that machines with rotors exceeding ten (10) inches in diameter can be designed with an air-gap approximately determined by the formula:

$$\frac{\text{Diameter in mils}}{1,160,000}+.014''$$

These air-gaps can be used in my improved dynamo electric machines without increasing the noise in any way.

Having fully described my invention, what I claim as new and desire to secure by Letters Patent of the United States is:

1. A dynamo electric machine having slotted members for the reception of windings, in which, in one member, the portion of the width of the tooth crowns, over any part of which magnetic lines of force can distribute uniformly in the operation of the machine, is substantially equal to the tooth pitch of the other member.

2. A dynamo electric machine having slotted members for the reception of windings in which the width of the tooth crowns of one member is substantially equal to the tooth pitch of the other member, the shape of the teeth of the first member being such that magnetic lines of force can distribute uniformly over the portions of the tooth crowns which are, at any given instant during the operation of the machine, opposite to a tooth or portions of teeth of the other member.

3. A dynamo electric machine having laminated inducing and induced members, each provided with slots for the reception of windings, in which the width of the tooth crowns of the inducing member is substantially equal to the tooth pitch of the induced member, the shape of the teeth of the inducing member being such that magnetic lines of force can distribute uniformly over the portions of the tooth crowns which are, at any given instant, during the operation of the machine, opposite to a tooth or portions of teeth of the induced member, said machine also having as small an air gap as mechanical conditions will permit.

In testimony whereof, I have hereunto set my hand and affixed my seal in the presence of the two subscribing witnesses.

VALÈRE ALFRED FYNN. [L. S.]

Witnesses:
W. A. ALEXANDER,
E. E. HUFFMAN.